July 10, 1934.  A. J. GRANBERG  1,965,892
FLUID METER
Filed March 12, 1930   3 Sheets-Sheet 1

INVENTOR.
Albert J. Granberg
BY
Townsend, Loftus & Abbett.
ATTORNEYS.

July 10, 1934.　　A. J. GRANBERG　　1,965,892
FLUID METER
Filed March 12, 1930　　3 Sheets-Sheet 2
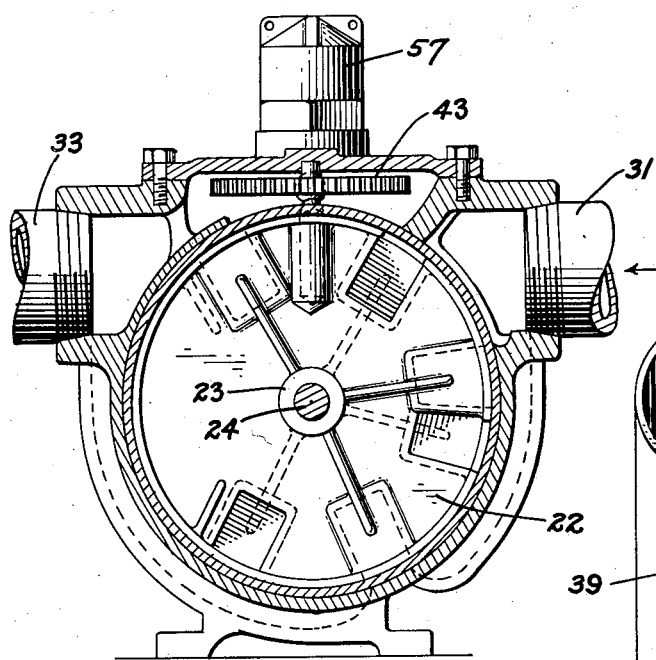
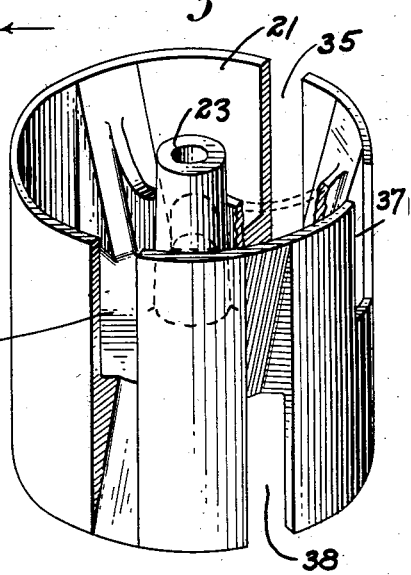
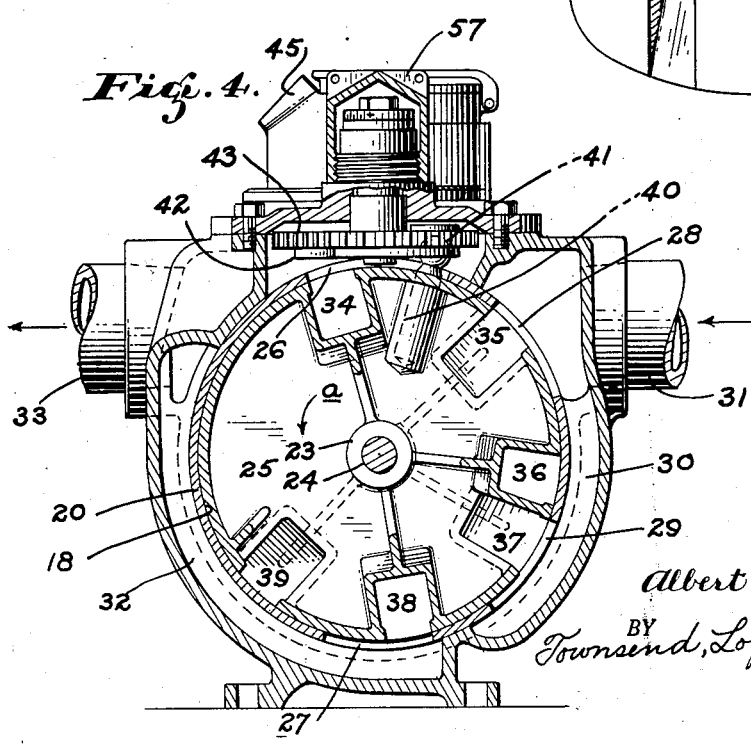
INVENTOR.
Albert J. Granberg
BY
Townsend, Loftus & Abbett.
ATTORNEYS.

July 10, 1934.   A. J. GRANBERG   1,965,892
FLUID METER
Filed March 12, 1930   3 Sheets-Sheet 3

INVENTOR.
Albert J. Granberg
BY Townsend, Loftus & Abbett
ATTORNEYS.

Patented July 10, 1934

1,965,892

UNITED STATES PATENT OFFICE 1,965,892

FLUID METER

Albert J. Granberg, Berkeley, Calif., assignor to Ralph N. Brodie Company, Oakland, Calif., a corporation of California Application March 12, 1930, Serial No. 435,291

4 Claims. (Cl. 73—30)

This invention relates to fluid meters of the type disclosed in my prior application entitled "Fluid meter", filed December 20, 1927 and bearing Serial Number 241,309.

It is the principal object of the present invention to generally improve the construction and operation of meters of the character referred to by providing a meter of maximum capacity from which air and foreign matter in the fluid metered will be readily expelled so as to maintain the efficiency and accuracy of the meter.

In carrying the invention into practice I provide a meter casing including two aligned cylinders each of which is fitted with a reciprocable and turnable piston. Cooperative ports are formed in the pistons and the cylinders so that the entrance of the fluid to the casing will cause the pistons to reciprocate and displace the fluid discharging from the cylinders. The discharge chamber communicating with the cylinders extends from the bottom to around the top of the pistons and the discharge ports in the pistons are arranged both at the top and bottom thereof so that gritty foreign substances will not accumulate at the bottom of the cylinder and any air in the fluid will not accumulate at the top thereof. The pistons are so constructed that a maximum intake and discharge port area is provided in order that the meter will have a maximum capacity.

One form which the invention may assume is exemplified in the following description and illustrated by way of example in the accompanying drawings, in which:

Fig. 3 is a transverse section through the meter taken on line III—III of Fig. 2.

Fig. 4 is a transverse section through the meter taken on line IV—IV of Fig. 2.

Fig. 5 is a perspective view of one of the pistons employed in the meter.

Figure 1:
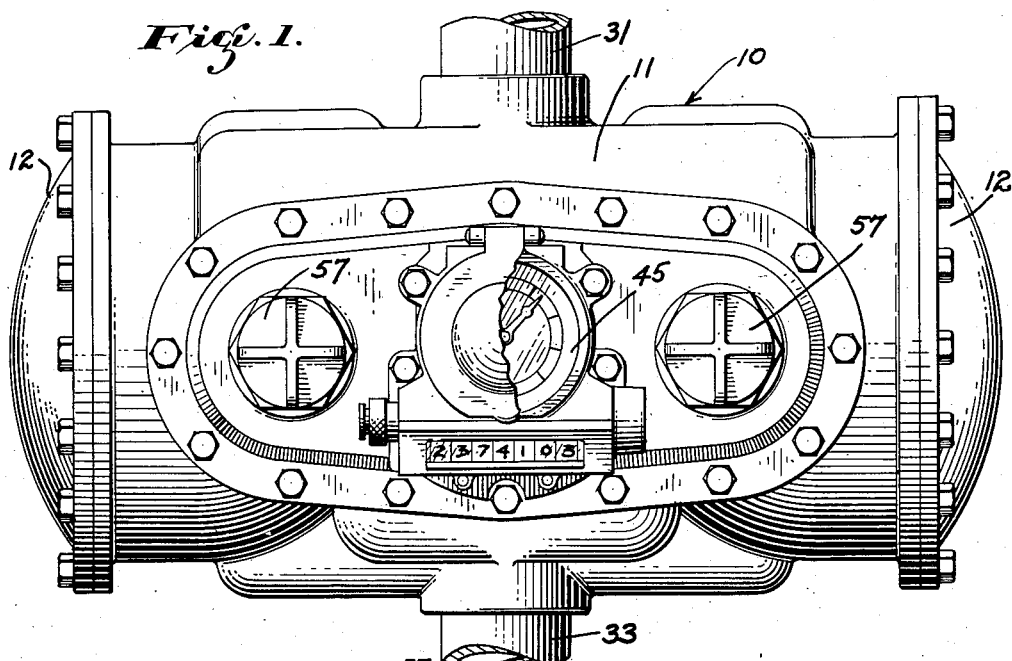
Fig. 1 is a plan view of a meter embodying the preferred form of my invention.

Referring more particularly to the accompanying drawings, 10 indicates a fluid meter capable of measuring and indicating the volume of fluid passed therethrough. The meter comprises a substantially cylindrical body member 11 the ends of which are enclosed by head members 12. These head members 12 are formed with flanges 14 complementary to flanges 15 on the body member 11, which flanges are connected together by cap screws or bolts 16.

The cylindrical body member is formed with a longitudinal bore which is transversely and centrally divided by a partition wall 17 which divides the bore into two metering cylinders 18 and 19. These metering cylinders 18 and 19 are lined with liners 20 preferably of a non-corrodible material. The liners 20 are bored to receive pistons 21 and 22. The pistons in the cylinders 18 and 19 are identical in construction except that they are of opposite hand.

The pistons 21 and 22 are each formed with an axial guide 23 reciprocably and turnably mounted on a stationary shaft 24 secured axially of the cylinders. The shaft 24 is supported at its ends in the head members 12 and at its center in the partition 17. This latter partition is so constructed as to enable the parts to be expeditiously assembled and aligned. The pistons 21 and 22 are just slightly less in diameter than the diameter of the cylinders 18 and 19 so that a running fit between the surfaces of the pistons and the cylinders will result. This mounting of the pistons is such as to permit them to turn freely and reciprocate in the respective cylinders.

Each piston is hollow with its opposite ends open but provided centrally between its ends with an imperforate partition wall 25. This central partition in the piston of each cylinder effectively divides the cylinder into two metering chambers as will be described. As the construction of each cylinder and piston is the same that of but one will be described.

Figure 2:
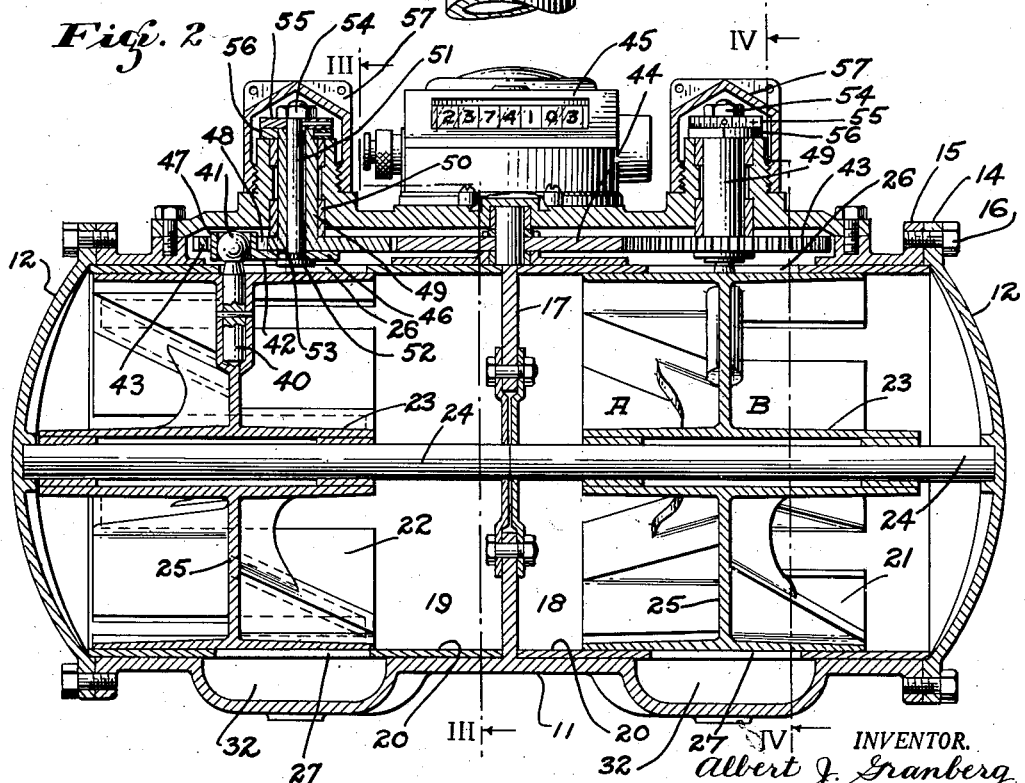
Fig. 2 is a central longitudinal section through the same.

Reference being had to Figs. 2, 4 and 5 it will be seen that the cylinder 18 is formed with an upper discharge port 26 and a lower discharge port 27 and an upper intake port 28 and a lower intake port 29. The body member 11 is formed with an intake chamber 30 which communicates with the ports 28 and 29 of both of the cylinders. Conduit 31 may be connected with the body member in order that fluid under pressure may be delivered to the intake chamber 30 and from this chamber through the ports to the metering chambers.

The body member 11 is also formed with a discharge chamber 32 which extends from a point below the bottom of the cylinders to a point above the top thereof as indicated in Fig. 4. This discharge chamber 32 communicates with the lower discharge ports 27 and with the upper discharge ports 26 of both of the cylinders 18 and 19. A conduit 33 is connected with the body member 11 in communication with the discharge chamber 32 so that fluid passing through the discharge chamber 32 may be conducted from the meter.

The pistons are so constructed that fluid entering the meter will cause them to reciprocate. This is accomplished by first dividing the piston by means of the partition wall 25 and forming the piston with ports so that the fluid may be delivered to opposite ends of the piston at opposite ends of the stroke thereof. Reference had to Figs. 4 and 5 it will be seen that each piston is formed with six ports three of which communicate with one end of the piston and three of which communicate with the opposite end. The ports are so constructed that they extend the full length of the piston as illustrated thereby forming communication between opposite ends of the piston.

In Fig. 2, I have indicated the inner end of the piston 18 by A and the outer end of the piston by B. The ends of the ports which communicate with the outer end B of the piston extend to the inner end A of the piston, but at this end the wall of the piston is merely recessed on an angle so that the fluid will be directed to the side of the partition 25 at the end B of the piston. The ports which communicate with the opposite ends of the piston are similarly recessed.

I have indicated the ports in the piston by the numerals 34, 35, 36, 37, 38 and 39 in Figs. 4 and 5. When the piston is in the position shown in Fig. 4 the ports 34 and 38 communicate with the discharge openings 26 and 27 while the ports 35 and 37 communicate with the intake ports 28 and 29. The ports 35 and 37 communicate with the cylinder at the end B of the piston while the ports 34 and 38 communicate with the cylinder at the end A of the piston. Therefore, fluid entering the chamber at the end B of the piston will cause the piston to move inwardly to displace the fluid in the chamber at the inner end of the piston causing the fluid to discharge through the ports 34 and 38 in the piston and the discharge ports 26 and 27 in the cylinder.

It should be stated, however, that the pistons are turned as they are reciprocated in order to control the ports. To accomplish this each piston is fitted with a radial pin 40 which projects radially from the peripheral surface of the piston at a point centrally between its ends. The outer end of this pin 40 is formed with a ball 41 engaging a socket member 42 relatively fixed to a spur gear 43 rotatably mounted in the discharge chamber 32 above the piston. The point of connection between the pin 40 and the gear 43 is at an eccentric point on the latter so that when the piston reciprocates it imparts rotation to the gear which rotation, of course results in oscillation of the piston, the amount of oscillation being regulated by the length of the stroke of the outer end of the pin 40. The stroke of the outer end of the pin 40 is substantially equal to the width of the ports in the piston.

Therefore, assuming the parts to be in the position shown in Fig. 4 with the gear 43 adapted to revolve in an anti-clockwise direction, as the fluid urges the piston inwardly the pin 40 will move toward center causing the piston to revolve in the direction of the arrow "a" in Fig. 4, thereby gradually closing the ports 34, 35, 37 and 38 until the end of the stroke of the piston is reached when all of said ports will be entirely closed.

Cooperation of the other piston as will be described causes continued movement of the gear 43 which reverses the axial movement of the piston but continues to rotate it in the same direction. Thus, the piston is moved axially and as it moves axially it continues to turn in the direction of the arrow "a" registering the ports 35 and 39 with the discharge ports 26 and 27 and registering the ports 36 and 38 with the intake ports 28 and 29. Thus the fluid will be delivered to the opposite end of the piston or that indicated by A and enabling the exit of fluid from the other end of the piston or that indicated by B. Therefore, the fluid admitted to the end A of the piston will cause the piston to advance to displace the fluid at the opposite end of the piston which passes outwardly through the discharge ports and through the conduit 33.

As previously described, the pistons in both cylinders are identical in construction and operation except that they are of opposite hand. The gears 43 of the pistons mesh with a central master gear 44 so that they will operate in synchronism. In order that one piston may carry the other over dead center as just described the pins 40 of the pistons are arranged relatively ninety degrees apart so that when one piston reaches dead center the other will be at the center of its stroke so as to move the other piston from dead center so as to continue its operation.

As the volume of fluid displacement can be measured, the amount of fluid displaced during the strokes of the pistons can be determined and the volume displaced during each complete revolution of the master gear 44 can be accurately computed due to the fact that this master gear is driven by the gears 43 which in turn are operated by the pistons 21 and 22. Thus, I utilize this master gear 44 to drive an indicating or counting mechanism 45 of any preferred type at the correct ratio relative to the operation of the pistons.

For purposes of adjustment the point of connection between the pins 40 and the gear 43 may be adjusted relative to the center of the gears 43. This is accomplished by adjusting the socket member 42 by means of which the pins 40 are connected to the gears 43.

Figure 6:
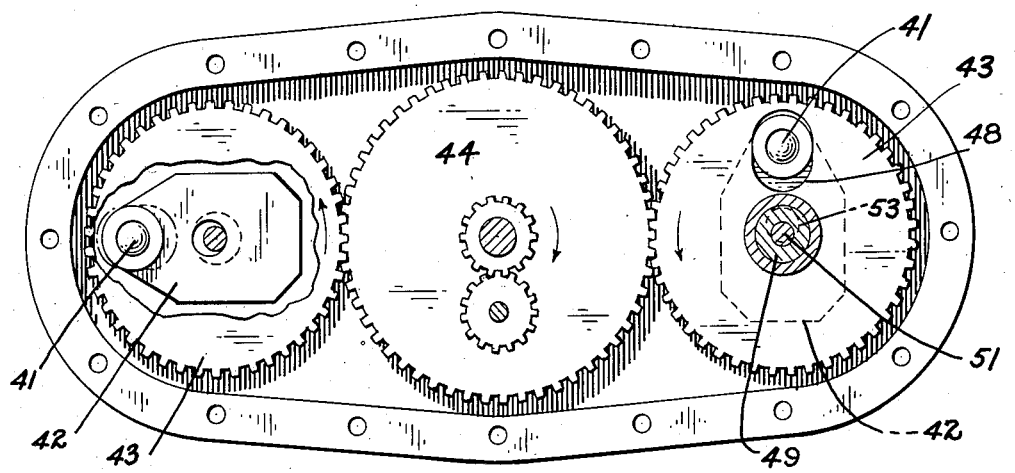
Fig. 6 is a plan view of the upper portion of the discharge chamber showing the arrangement of the gears therein.
Figure 7:
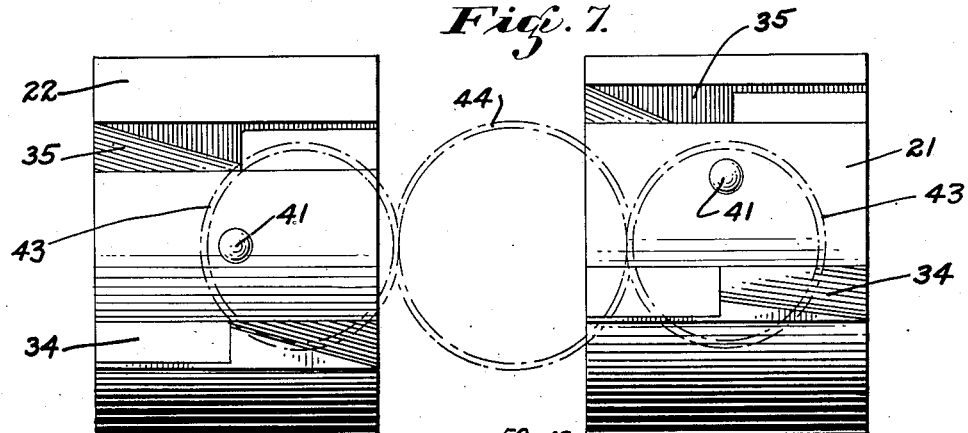
Fig. 7 is a diagrammatic view showing the pistons and ports and their relative positioning with relation to the counter driving gears.
Figure 8:
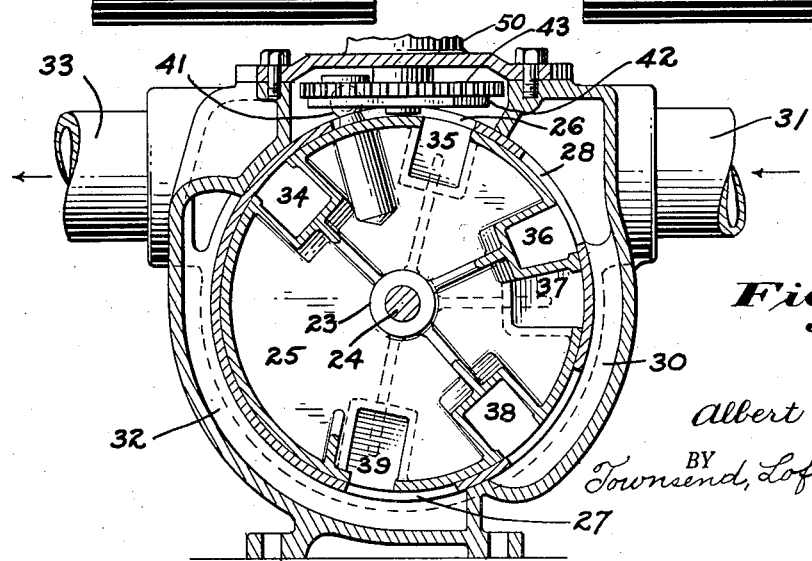
Fig. 8 is a transverse sectional view through the meter taken on the same line as Fig. 4 showing the ports reversed.

It will be noticed from Figs. 2 and 6 that the socket members 42 each include a flat portion 46 abutting against the bottom of the gear 43 to which it is connected and a socket 47 disposed in a slotted radial opening 48 in the gear. The hub 49 of each gear 43 revolves in a bearing 50 on the body member 11. An adjusting pin 51 is provided for each gear end extends axially through the hub of the gear and is fitted at its inner end with a head 52 which engages the flat portion 46 of the socket member 42 to clamp the same to the gear. The adjusting pin 51 is formed with an eccentric portion 53 engaging an opening in the socket member so that upon turning movement of the adjusting pin 51 the socket portion 47 of the socket member 42 will be moved radially relative to the gear 43 and thereby adjust the position of the point of connection between the pin 40 and the gear 43.

In order to maintain such adjustment the upper end of each adjusting pin 51 is fitted with a nut 54. A collar 55 is feathered to the pin 51 and a collar 56 is feathered to the hub 49 of the gear. These collars are suitably calibrated so as to indicate the amount of relative rotation therebetween during adjustment. By loosening the nut 54 turning movement of the pin 51 can be accomplished through the collar 55. Upon sufficient amount of adjustment the nut is retightened which acts to clamp the socket member 42 to the gear.

In operation of the apparatus the meter is interposed in a pipe line through which fluid is being conducted in the directions of the arrows shown in Fig. 4. The fluid entering the intake chamber 30 will seek outlet through the cylinders.

Assuming that the pistons are in the positions shown in Figs. 2 and 4 the piston 22 will be on dead center while the piston 21 will be at the center of its inner stroke. In this position fluid will be passing through the ports 35 and 37 to the end B of the piston so as to move the piston inwardly and displace the fluid at the inner end A of the piston which is discharging through the ports 34 and 38 into the discharge chamber 32. As the piston 21 moves inwardly it will, of course, impart movement to its gear 43 and through the master gear 44 will impart movement to the gear 43 of the piston 22, moving the same off center so that the intake ports of the latter will commence registering with the intake ports in the cylinder 19 and is discharge ports aligned with the discharge ports of the cylinder. Thus, the piston 22 will be actuated by the fluid and when it reaches the center of its stroke the opposite piston will be on dead center and will continue in operation as previously described.

As the motion of the pistons is translated into rotary movement of the gears 43 and as these gears are operatively associated with the master gear 44 and the latter is operatively associated with the counter mechanism 45, the volume of fluid passing through the meter will be accurately measured and indicated.

I desire to point out that in the present meter I have provided two intake ports and two discharge ports so that a maximum port area is available in order that the meter will have a large capacity.

I also desire to point out that the intake chamber 32 extends from the bottom of the pistons around the same to the top thereof and that there is a discharge port in the piston communicating with the bottom of the intake chamber and with the top thereof. This is extremely advantageous for the reason that should any grit, dirt or any heavy foreign material be in the fluid the same will settle to the bottom and will readily discharge into the bottom of the discharge chamber and therefore be carried out of the meter without getting between the wearing surfaces thereof.

Also, any air in the fluid will rise and will pass out of the upper discharge port 26 and be discharged from the meter.

In other words, I have made provision for preventing both the accumulation of heavy foreign matter and the accumulation of air in the meter.

Manufacturers of prior meters have met with the difficulty of air becoming lodged in the meter and rendering the operation of the same inaccurate. This is impossible in the present instance as I have made ample accommodation for the discharge of any air and have so arranged the ports that the accumulation of the same in the meter is prevented.

Should it be desired to adjust the meter the caps 57 may be removed and the strokes of the pins 40 altered a desired amount to compensate for any inaccuracy.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A meter comprising a body having a pair of cylinders formed therein, said body being formed with an intake chamber and a discharge chamber partly underlying and partly overlying the cylinders, each cylinder being formed with a pair of discharge ports arranged one in the upper wall and one in the bottom wall of the cylinder and forming a communication between the interior of the cylinder and the discharge chamber, each cylinder being formed with intake ports forming a communication between the interior of the cylinder and the intake chamber, a piston in each cylinder, each piston being formed with ports cooperating with the intake and discharge ports, alternate ports in the piston communicating with opposite ends of the piston, crank means connected with each piston to oscillate the same during the reciprocation thereof whereby the registering of the ports in the pistons with the ports in the cylinders in the the pistons with the ports in the cylinders will be reversed at the end of each stroke of the piston whereby fluid from the intake chamber will be alternately admitted to opposite ends of the cylinders, an operative connection between the crank means of the pistons whereby they will operate in synchronism and in overlapping cycles, and indicating means operated by the crank means of the pistons to indicate the volume of fluid passing through the meter.

2. A meter of the character described comprising a body member having a pair of horizontally disposed cylinders, said body member being formed with an intake chamber and with an exhaust chamber, said exhaust chamber extending from a point beneath the cylinders to a point above the cylinders, each cylinder being formed with a pair of discharge ports disposed one in the upper portion of the cylinder wall and one in the bottom portion of the cylinder wall, said ports forming a communication between the interior of the cylinder and the discharge chamber, each cylinder being formed with a pair of intake ports forming communication between the intake chamber and the interior of the cylinder, a hollow piston in each cylinder, said piston being centrally divided, each piston being formed with a plurality of ports alternately communicating with opposite ends of the piston, said ports being adapted to be placed in register with the ports in the cylinder, crank means for oscillating the pistons as they reciprocate whereby to control the registering of the ports in the pistons with the ports in the cylinders and to cause fluid to be delivered from the intake chamber alternately to opposite ends of the cylinders and to permit fluid to discharge from the cylinders from the end of the cylinders opposite that to which fluid is being delivered from the intake chamber, means operatively connecting the crank means of the pistons together whereby they will operate in synchronism and in overlapping cycles, and a counter mechanism operatively connected with the crank means of the pistons for tallying the combined operations of the pistons.

3. In a meter of the character described having a body formed with a cylinder, a reciprocable and oscillatory piston therein, a rotatable gear lying in a plane parallel to the longitudinal axis of the piston and closely adjacent to the side wall of the piston intermediate the ends of the stroke thereof, a radial member projecting from the wall of the piston, a socket member carried by the gear to revolve with the gear and having a socket positioned eccentrically with respect to the axis of rotation of the gear, said socket being connected to said radial member, a bearing on the body coaxially of the gear, said gear having a hub projecting through said bearing and rotatable therein, said gear and hub being axially bored, an adjusting pin projecting coaxially through the gear and hub and having an enlarged end to engage the socket member to clamp the same to the gear, an eccentric portion on the adjusting pin engaging said socket member whereby rotation of the pin will vary the amount of eccentricity of the socket, and means for clamping said pin in fixed relation to the gear.

4. In a meter of the character described having a body formed with a cylinder, a reciprocable and oscillatory piston therein, a rotatable gear lying in a plane parallel to the longitudinal axis of the piston and closely adjacent to the side wall of the piston intermediate the ends of the stroke thereof, a radial member projecting from the wall of the piston, a socket member carried by the gear to revolve with the gear and having a socket positioned eccentrically with respect to the axis of rotation of the gear said socket being connected to said radial member, a bearing on the body coaxially of the gear, said gear having a hub projecting through said bearing and rotatable therein, said gear and hub being axially bored, an adjusting pin projecting coaxially through the gear and hub and having an enlarged end to engage the socket member to clamp the same to the gear, an eccentric portion on the adjusting pin engaging said socket member whereby rotation of the pin will vary the amount of eccentricity of the socket, a collar secured on the gear hub exteriorly of said bearing, a collar secured on the adjusting pin contiguous to the collar on the hub, the peripheral faces of said collars being calibrated whereby relative rotation therebetween may be to a desired extent, a nut on the adjusting pin to clamp the adjusting pin, the collars and the socket member in fixed relation to the gear.

ALBERT J. GRANBERG.